United States Patent Office
3,530,195
Patented Sept. 22, 1970

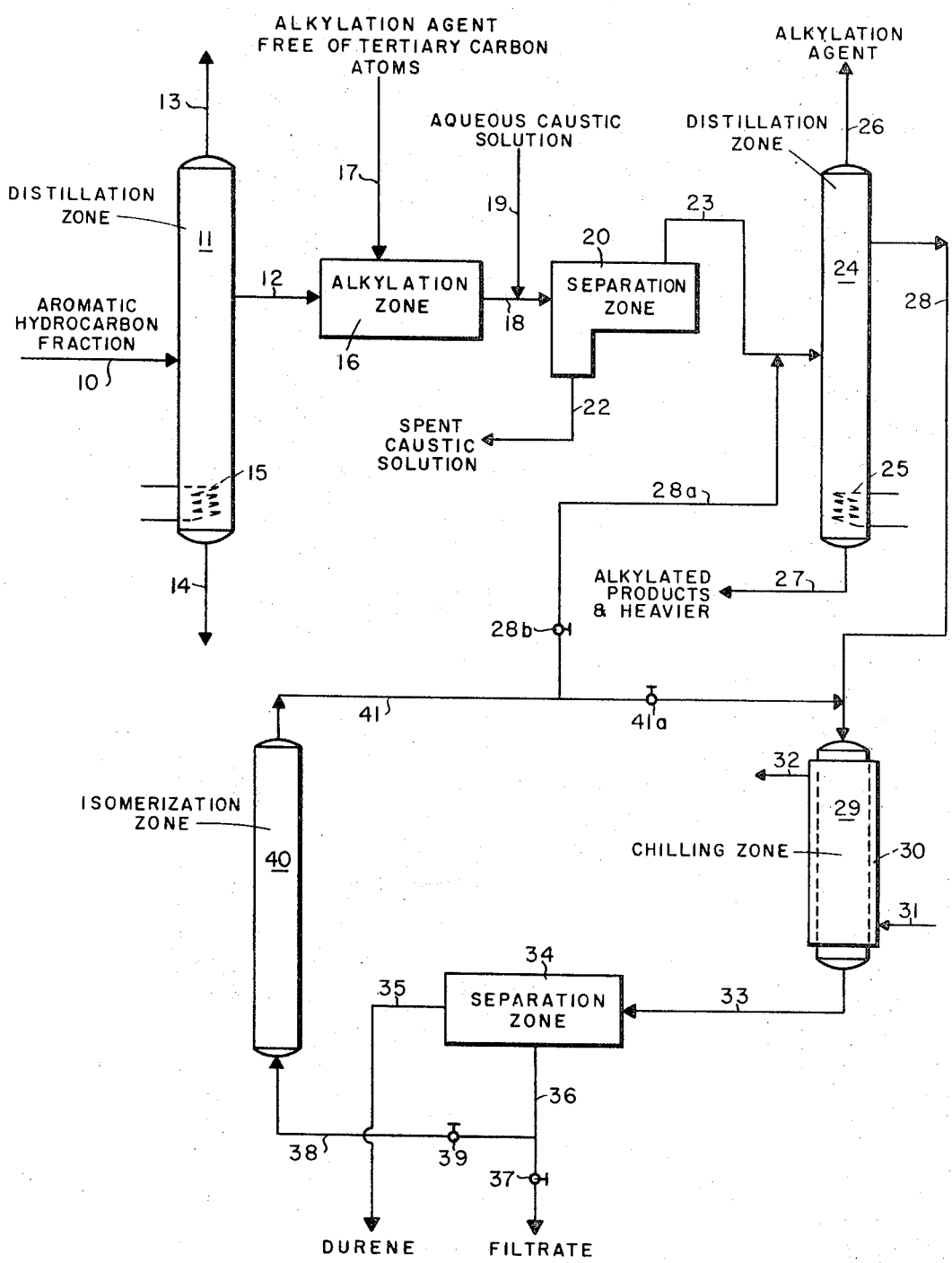

3,530,195
SEPARATION AND PURIFICATION OF DURENE
Emanuel M. Amir, Baytown, Tex., assignor to Esso Research and Engineering Company
Filed May 3, 1968, Ser. No. 726,342
Int. Cl. C07c 3/50, 7/14, 15/00
U.S. Cl. 260—674
14 Claims

ABSTRACT OF THE DISCLOSURE

Durene is separated and purified by subjecting a fraction containing durene, isodurene, and other $C_{10}$ aromatic hydrocarbons to alkylation under alkylation conditions with an alkylation agent free of tertiary carbon atoms whereby the durene and isodurene are not alkylated; the product may be treated with an alkaline reagent to remove acid catalyst and is then distilled to remove excess alkylation agent and alkylated products. The durene fraction is recovered and chilled to crystallize the durene which is then separated from the mother liquor. The latter, which is rich in isodurene, may be isomerized to produce more durene.

CROSS-REFERENCES TO RELATED APPLICATIONS

This application is related to Ser. No. 543,380, entitled "Purification of Mesitylene" filed Apr. 18, 1966, for Emanuel M. Amir, now Pat. No. 3,418,389.

BACKGROUND OF THE INVENTION

Field of the invention

The present invention is directed to the separation and purification of durene which is 1,2,4,5-tetramethylbenzene. More particularly, the invention is concerned with the recovery of durene from an impurities-containing aromatic hydrocarbon fraction having a boiling range between about 360° to about 420° F. In its more specific aspects, the invention is concerned with the purification of durene-isodurene mixture by selective alkylation of impurites.

Description of the prior art

It is known to separate aromatic hydrocarbons by alkylation of certain impurities. However, where alkylation has been employed, a tertiary alkylation agent has been used and the alkylation has not been selective which resulted in that only a part of the undesirable impurities were alkylated. It is also known to recover durene by chilling a durene-containing fraction and recovering crystallized durene from the slurry or mother liquor. By virtue of the presence of isomers and other close boiling fractions, it has been necessary to use low temperatures to obtain maximum yield of durene crystals in even a relatively pure state. These problems have now been resolved by selective alkylation of the impurities, removal of same and chilling a purified durene-containing fraction to a relatively high temperature and then recovering a highly purified product by separating crystallized durene from the mother liquor or slurry of crystals in mother liquor.

SUMMARY OF THE INVENTION

The present invention may be briefly described as a process for recovering 1,2,4,5-tetramethylbenzene from an aromatic hydrocarbon fraction, such as a $C_{10}$ aromatic hydrocarbon fraction, containing 1,2,4,5-tetramethylbenzene and 1,2,3,5-tetramethylbenzene in admixture with dimethyl ethyl benzenes, methyl butyl benzene, methylindanes, together with other aromatic hydrocarbons, as alkylatable impurities. In the present invention, the impurities are alkylated with an organic alkylation agent containing more than two carbon atoms and free of or containing no tertiary carbon atoms. The selective alkylation is conducted in the presence of an acid catalyst to form an alkylate containing purified 1,2,4,5-tetramethylbenzene and 1,2,3,5-tetramethylbenzene and alkylated impurities. The purified 1,2,4,5-tetramethylbenzene and 1,2,3,5-tetramethylbenzene is recovered such as by distilling the alkylate. Chilling the purified durene fraction causes the durene to crystallize. The durene crystals are separated from the mother liquor. The filtrate may be isomerized to produce more durene.

VARIABLES OF THE INVENTION

The alkylation agent is an organic alkylation agent which contains more than two carbon atoms and is free of or contains no tertiary carbon atoms, both cyclic and acyclic. The alkylation agent is preferably propylene, but the normal butenes such as 1- and 2-butenes, the normal pentenes such as 1- and 2-pentenes, the higher homologs of linear and cyclic olefins, the normal olefins, mixtures of the normal olefins, and the like, having up to 20 carbon atoms, may be used. There is no upper limit to chain length of the alkylating agent, however. Likewise, primary and secondary alcohols having from 3 to 20 carbon atoms may also be employed. Similarly, primary and secondary organic halides, such as isopropyl chloride, butyl and pentyl chlorides, and up to eicosyl chloride, and the like may be used. Primary and secondary mercaptans such as isopropyl mercaptan, secondary butyl mercaptan, and the like may also be employed.

The alkylation catalyst is preferably aluminum chloride but may be any of the Friedel-Crafts catalysts such as aluminum chloride, ferric chloride, stannic chloride, boron trifluoride and the like. The mineral acids such as sulfuric, phosphoric, and hydrofluoric may also be used.

When the alkylation catalyst is aluminum chloride, it may be used in an amount within the range from about 0.1 to about 20% by weight in the aromatic hydrocarbon.

The alkylation is conducted by reacting aromatic hydrocarbon fractions containing 1,2,4,5-tetramethylbenzene and 1,2,3,5-tetramethylbenzene at suitable temperature and pressure conditions to maintain a liquid phase and to obtain alkylation. The amount of the alkylation agent may range from about 1 to 5 mols per mol of aromatic hydrocarbon impurities.

The preferred catalyst is aluminum chloride when the alkylation agent is an olefin or an alkyl halide. Temperatures within the range from about 25° to about 100° C. may be used with preferred temperatures in the range from 40° to 80° C. with aluminum chloride.

The feedstock may suitably contain from about 15% up to about 30% by volume of 1,2,4,5-tetramethylbenzene. It is preferred that the feedstock contain as much 1,2,4,5-tetramethylbenzene as possible but the range given is that practically achievable by distillation.

In Table I the typical components of a feedstock are given illustrating the closeness of their boiling points.

TABLE I

| Compound: | Boiling point, ° C. |
|---|---|
| 1,4-dimethyl-2-ethylbenzene | 186.9 |
| 1,3-dimethyl-4-ethylbenzene | 188.4 |
| 1-methyl-3-t-butylbenzene | 189.3 |
| 1,2-dimethyl-4-ethylbenzene | 189.8 |
| 1,3-dimethyl-2-ethylbenzene | 190.0 |
| 1,2-dimethyl-3-ethylbenzene | 193.9 |
| Durene | 196.8 |
| Isodurene | 198.0 |
| 5-methylindane | 202.3 |
| 4-methylindane | 203.9 |
| 1,2,3,4-tetramethylbenzene | 205.0 |

The actual composition depends on the precision of the distillation; the actual concentration of durene is usually about 15–30%. The durene is usually separated from such a mixture by cooling until pure durene crystals are formed which are then separated by filtration or centrifugation. Because of the relatively low concentration of durene and especially because of the presence of the other components, to obtain maximum yield of durene, the crystallization temperature must be very low, usually below −50° F. Under these conditions, the cooled mixture has a high viscosity and the durene crystals formed are very small making the filtration or centrifugation rather difficult. The filtrate is usually not suitable for further processing as a source of additional durene such as by isomerization.

BRIEF DESCRIPTION OF THE DRAWING

The present invention will be further illustrated by reference to the drawing which is a flow diagram of a preferred mode and embodiment.

DESCRIPTION OF THE PREFERRED EMBODIMENTS WITH RESPECT TO THE DRAWING AND EXAMPLES

Referring now to the drawing, numeral 10 designates a line by way of which an aromatic hydrocarbon fraction obtained from a source not shown is introduced into a distillation zone 11 which may be a single or plurality of distillation towers which allows the obtaining of a $C_{10}$ aromatic hydrocarbon fraction containing durene and isodurene which is withdrawn by line 12. $C_9$ and lighter aromatic hydrocarbons are discharged by line 13 while heavier aromatic hydrocarbons are discharged by line 14.

Temperature and pressure in zone 11 are achieved by heat means illustrated by steam coil 15 which may be an external reboiler or furnace as may be desired.

The durene fraction is introduced by line 12 into an alkylation zone 16 into which is introduced by line 17 an alkylation agent which contains no tertiary carbon atoms or in other words is free of tertiary carbon atoms. In alkylation zone 16, the impurities shown in Table I are alkylated selectively with alkylation agent leaving a fraction susbtantially free of $C_{10}$ aromatic hydrocarbons other than durene and isodurene and containing alkylated impurities and unused alkylation agent.

The product from alkylation zone 16 is discharged by line 18 where it is admixed with an aqueous caustic solution such as sodium hydroxide solution having a concentration from about 2 to about 50 wt. percent of sodium hydroxide introduced by line 19. Line 18 may contain downstream from line 19 a suitable mixing device not shown such as an incorporator for contact with the alkylated product prior to discharging by line 18 into separation zone 20. Separation zone 20 is provided with a leg or sump 21 for withdrawal of spent or used caustic solution by way of line 22. The caustic washed product is then withdrawn from separation zone 20 by line 23 and introduced thereby into a distillation zone 24 provided with a heating means such as steam coil 25 which may be any other heating means such as an external reboiler or furnace. Zone 24 like zone 11 may be a single or plurality of distillation towers as required. Unreacted alkylation agent, if present, may be removed from distillation zone 24 by line 26 for recovery and reuse in the process or discharged by line 27.

The purified durene fraction is withdrawn by line 28 and introduced thereby into a chilling zone 29 provided with a jacket 30 through which a suitable refrigerant is circulated through lines 31 and 32 to reduce the temperature of the durene fraction withdrawn by 28 to about +5° F. which results in the formation of the slurry of durene crystals and mother liquor. A temperature within the range from about 10° to about −15° F. may be employed in the chilling zone 29. If prehnitene is present much lower temperatures are required and it is preferred to remove same with the alkylated products in zone 24. This slurry is withdrawn from chilling zone 29 and introduced thereby into a separation zone 34 which may be a filtration zone, a centrifugation zone, or a combination of the two, or it may be a settling zone or any zone where the crystals are separated from the mother liquor. In any event, durene crystals of high purity are withdrawn by line 35 for use as may be desired after liquefaction such as oxidation to pyromellitic dianhydride which is used in high temperature resins, plasticizers, etc. The filtrate or mother liquor is withdrawn by line 36 and may be discharged from the system by opening valve 37. Preferably valve 37 remains closed and the filtrate is recycled by line 38 controlled by valve 39 to an isomerization zone 40 which suitably involves a method of isomerizing aromatic hydrocarbons as disclosed and claimed in Ser. No. 604,853, "Method of Isomerizing Polymethylbenzene," by Emanuel M. Amir, Edward F. Wadley, and Robert D. Wesselhoft, filed Dec. 27, 1966, now Pat. No. 3,410,919. The isodurene in zone 40 is separated and withdrawn by line 41 and may be introduced into line 28 as may be desired. Instead of routing the isodurene directly to line 28 it is preferably introduced into distillation zone 24 by branch line 28a controlled by valve 28b for removal of any light and heavy products produced in zone 40. In such case, valve 41a is closed. It is preferred to route the isomerizate to line 23 since some prehnitene is produced in zone 40 which is removed in zone 24. If the prehnitene is not removed, lower chilling temperatures may be required.

It will be seen from the description of the drawing that a simple and effective method is provided for separation and purification of durene.

In order to illustrate the invention further, the following runs were made:

A heartcut from distillation of an aromatic hydrocarbon fraction was obtained by fractional distillation of a sample of this stream in a 100-plate column such as column 11 at 20:1 reflux ratio. The heartcut, which had a boiling range of 380°–396° F., had the analysis given in Table II.

TABLE II.—ANALYSIS OF HEARTCUT

| | Wt. percent |
|---|---|
| Durene | 20.14 |
| Isodurene | 45.11 |
| Other $C_{10}+C_{11}$ | 34.75 |

A portion of this heartcut was alkylated with sec. butylchloride using aluminum chloride catalyst. The alkylation was carried out by adding about 0.5 mole sec. butylchloride to 1 mole of heartcut feed containing about 0.5 wt. percent $AlCl_3$. The reaction was carried out at 50°–55° C. for 2.5 hrs. The reaction products were washed with 25% aqueous caustic to remove the aluminum chloride, dried and distilled in a 5-plate column at 10:1 reflux ratio.

After some unreacted sec. butylchloride was distilled, the $C_{10}$ fraction was collected at a boiling range of 370°–400° F. The distillation stopped at this point until the next higher boiling point material distilled; this was about 450° F., which was the alkylated material. This shows the ease of separation of the unalkylated from the alkylated fraction.

The overhead fraction of boiling range of 370°–400° F. had the composition given in Table III.

TABLE III.—OVERHEAD FROM ALKYLATION

| | Wt. percent |
|---|---|
| Durene | 27.81 |
| Isodurene | 68.88 |
| Other $C_{10}+C_{11}$ | 3.31 |

The durene and isodurene converted to higher boiling material during the alkylation was estimated to be less than 5% from the analysis of the distillation bottoms.

The overhead from distillation (Table III) was cooled to 5° F. and the crystals separated from the liquid by filtration-centrifugation.

The crystal cake had the analysis given in Table IV.

TABLE IV.—DURENE CRYSTALS CAKE

| | Wt. percent |
|---|---|
| Durene | 95.9 |
| Others | 4.1 |

This durene is pure enough for use without further purification.

The weight of the durene in the cake represented 69% of the durene present in the original feed to the alkylation.

The filtrate had the composition given in Table V.

TABLE V.—FILTRATE FROM DURENE CRYSTALLIZATION

| | Wt. percent |
|---|---|
| Durene | 11.63 |
| Isodurene | 83.88 |
| Other $C_{10}+C_{11}$ | 4.49 |

This stream is suitable for isomerization to produce more durene.

In contrast to the above operations, another portion of the original heartcut of Table II was cooled to 5° F. and the durene recovered by filtration and centrifugation. The analysis of this durene is given in Table VI.

TABLE VI.—DURENE FROM DIRECT COOLING

| | Wt. percent |
|---|---|
| Durene | 87.9 |
| Others | 12.1 |

This durene is not pure enough for use directly and must be purified further before it is of acceptable purity. The amount of durene recovered in this operation corresponds to 41% of the durene charged.

The filtrate from direct cooling, since it contains about 40% other than durene and isodurene, is not a suitable feed for isomerization and is usually discarded back into the aromatic hydrocarbon stream such as fed to column 11.

It will be seen from the foregoing operations that greatly improved and unobvious results are obtained by alkylating the impurities in accordance with the present invention.

The nature and objects of the present invention having been completely described and illustrated and the best mode and embodiment thereof contemplated set forth what I wish to claim as new and useful and secure by Letters Patent is:

1. A process for recovering 1,2,4,5-tetramethylbenzene and 1,2,3,5-tetramethylbenzene from an impurities-containing aromatic hydrocarbon fraction containing 1,2,4,5-tetramethylbenzene and 1,2,3,5-tetramethylbenzene and boiling within the range from about 360° to about 420° F. which comprises:
   selectively alkylating said impurities with an organic alkylation agent containing more than two carbon atoms and free of tertiary carbon atoms;
   in the presence of an acid catalyst;
   to form an alkylate containing purified 1,2,4,5-tetramethylbenzene, 1,2,3,5-tetramethylbenzene, and alkylated impurities;
   distilling said alkylate to recover a fraction containing said 1,2,4,5-tetramethylbenzene and 1,2,3,5-tetramethylbenzene and substantially free of alkylated impurities;
   chilling said recovered fraction to form crystals of 1,2,4,5-tetramethylbenzene in a mother liquor; and
   recovering said crystallized 1,2,4,5-tetramethylbenzene from said mother liquor.

2. A method in accordance with claim 1 in which the alkylation agent is propylene.

3. A method in accordance with claim 1 in which the alkylating agent is normal butenes.

4. A method in accordance with claim 1 in which the alkylating agent is normal pentenes.

5. A method in accordance with claim 1 in which the alkylating agent is a mixture of normal olefins.

6. A method in accordance with claim 1 in which the alkylating agent is secondary butyl chloride.

7. A method in accordance with claim 1 in which the acid catalyst is aluminum chloride.

8. A method in accordance with claim 1 in which the boiling range is within the range from about 380° to about 400° F.

9. A method in accordance with claim 1 in which the recovered fraction is chilled to a temperature within the range of 10° to —15° F.

10. A method in accordance with claim 1 in which:
   (a) the catalyst is aluminum chloride;
   (b) the boiling range is within the range from about 380° to about 400° F.;
   (c) the alkylation agent is secondary butyl chloride; and
   (d) the recovered fraction is chilled to a temperature within the range from about 10° to about —15° F.

11. A method in accordance with claim 1 in which the aromatic hydrocarbon fraction contains from about 15% to about 30% by volume of 1,2,4,5-tetramethylbenzene.

12. A method in accordance with claim 1 in which the catalyst is from about 0.1% to about 20% by weight of $AlCl_3$ in said aromatic hydrocarbon.

13. A method in accordance with claim 1 in which the mother liquor substantially free of 1,2,4,5-tetramethylbenzene is isomerized to form additional amounts of 1,2,4,5-tetramethylbenzene.

14. A method in accordance with claim 1 in which:
   (a) the catalyst is aluminum chloride;
   (b) the boiling range is within the range from about 380° to about 400° F.;
   (c) the alkylation agent is propylene; and
   (d) the recovered fraction is chilled to a temperature within the range from about 10° to about —15° F.

References Cited

UNITED STATES PATENTS

| 2,648,713 | 8/1953 | Schneider | 260—674 |
| 2,837,584 | 6/1958 | Hoff | 260—674 |
| 2,874,200 | 2/1959 | Sanford | 260—674 |
| 3,410,919 | 11/1968 | Amir et al. | 260—668 |
| 3,418,389 | 12/1968 | Amir | 260—674 |

DELBERT E. GANTZ, Primary Examiner

C. E. SPRESSER, JR., Assistant Examiner

U.S. Cl. X.R.

260—668, 671